United States Patent
Taoda

(10) Patent No.: US 12,476,125 B2
(45) Date of Patent: Nov. 18, 2025

(54) SUBSTRATE INSPECTION METHOD AND SUBSTRATE INSPECTION DEVICE

(71) Applicant: Tokyo Electron Limited, Tokyo (JP)

(72) Inventor: Isamu Taoda, Nirasaki (JP)

(73) Assignee: Tokyo Electron Limited, Tokyo (JP)

( * ) Notice: Subject to any disclaimer, the term of this patent is extended or adjusted under 35 U.S.C. 154(b) by 455 days.

(21) Appl. No.: 17/660,869

(22) Filed: Apr. 27, 2022

(65) Prior Publication Data

US 2022/0367220 A1 Nov. 17, 2022

(30) Foreign Application Priority Data

May 11, 2021 (JP) ................. 2021-080595

(51) Int. Cl.
| | | |
|---|---|---|
| *H01L 21/67* | (2006.01) | |
| *G01N 21/95* | (2006.01) | |
| *G06T 7/00* | (2017.01) | |
| *G06T 7/60* | (2017.01) | |
| *G06T 7/73* | (2017.01) | |
| *H01L 21/68* | (2006.01) | |
| *H01L 21/687* | (2006.01) | |

(Continued)

(52) U.S. Cl.
CPC ... *H01L 21/67288* (2013.01); *G01N 21/9501* (2013.01); *G06T 7/0004* (2013.01); *G06T 7/60* (2013.01); *G06T 7/73* (2017.01); *H01L 21/67167* (2013.01); *H01L 21/67265* (2013.01); *H01L 21/681* (2013.01); *H01L 21/68707* (2013.01); *H04N 5/2628* (2013.01); *H04N 25/701* (2023.01); *G06T 2207/30148* (2013.01)

(58) Field of Classification Search
CPC ......... G06T 7/0004; G06T 7/001; G06T 7/60; G06T 7/73; G06T 2207/30148; H01L 21/681; H01L 21/9501; H01L 21/67167; H01L 21/67265; H01L 21/67288; H01L 21/68707; H04N 25/701; H04N 5/2628
USPC .......................................................... 702/81
See application file for complete search history.

(56) References Cited

U.S. PATENT DOCUMENTS

| | | | |
|---|---|---|---|
| 2011/0199476 A1 | 8/2011 | Ravid et al. | |
| 2013/0056154 A1* | 3/2013 | Nakaya | H01J 37/32944 156/345.24 |
| 2020/0322525 A1* | 10/2020 | Yamagami | H04N 23/617 |

FOREIGN PATENT DOCUMENTS

| | | |
|---|---|---|
| JP | H09320510 A | 12/1997 |
| JP | 2008-064595 A | 3/2008 |

(Continued)

OTHER PUBLICATIONS

Hayashi et al., KR 20160030143A, "Substrate Transfer Apparatus, Substrate Transfer Method, and Recording Medium Having Recorded Program for Executing the Substrate Transfer Method", Date published: Mar. 16, 2016 (Year: 2016).*

*Primary Examiner* — John H Le
(74) *Attorney, Agent, or Firm* — Armstrong Teasdale LLP

(57) ABSTRACT

A substrate inspection method includes: capturing, while transporting a substrate with a fork, an image of a rear surface of the substrate using a line camera in which light receiving elements are arranged in a width direction orthogonal to a transport direction of the substrate; generating a corrected image by correcting the image captured in the capturing the image based on locus information of the fork when the substrate is being transported; and specifying feature information including a position of an abnormal portion existing on the rear surface of the substrate based on the corrected image.

14 Claims, 8 Drawing Sheets

(51) Int. Cl.
 *H04N 5/262* (2006.01)
 *H04N 25/701* (2023.01)

(56) References Cited

FOREIGN PATENT DOCUMENTS

| | | |
|---|---|---|
| JP | 2010-165876 A | 7/2010 |
| JP | 2021-005633 A | 1/2021 |
| KR | 20130006448 A | 1/2013 |
| KR | 20150135431 A | 12/2015 |
| KR | 20160103927 A | 9/2016 |
| KR | 20190011199 A | 2/2019 |
| WO | 2011115696 A2 | 9/2011 |

\* cited by examiner

FIG. 5
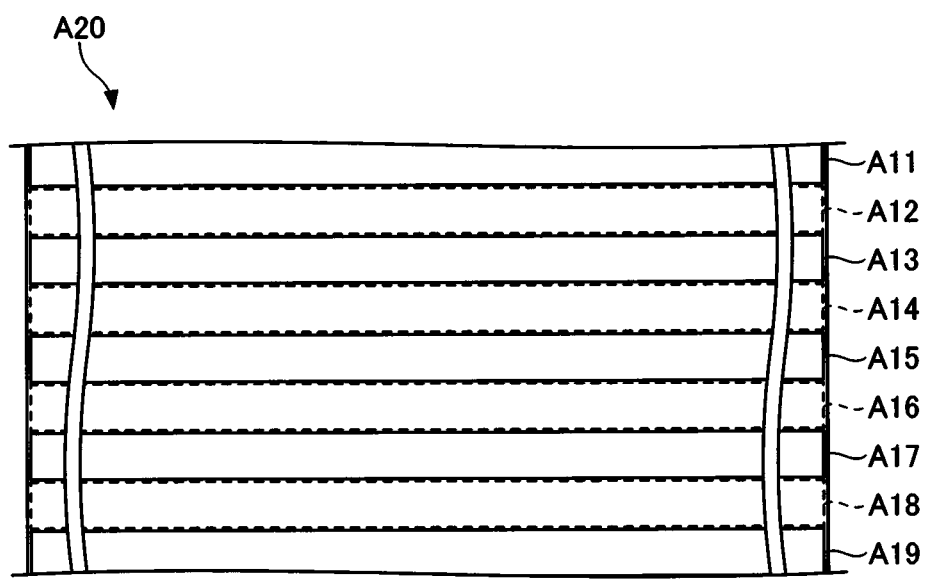
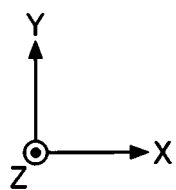

SUBSTRATE INSPECTION METHOD AND SUBSTRATE INSPECTION DEVICE

CROSS-REFERENCE TO RELATED APPLICATION

This application is based upon and claims the benefit of priority from Japanese Patent Application No. 2021-080595, filed on May 11, 2021, the entire contents of which are incorporated herein by reference.

TECHNICAL FIELD

The present disclosure relates to a substrate inspection method and a substrate inspection device.

BACKGROUND

There is known a technique of determining the presence or absence of foreign matter by comparing an image of the rear surface of a wafer obtained by imaging the rear surface of a wafer in the process of being transported using a line scan camera with a reference image of the rear surface of a wafer registered in advance (see, for example, Patent Document 1).

PRIOR ART DOCUMENT

Patent Document

Patent Document 1: Japanese Laid-Open Patent Publication No. 2021-005633

SUMMARY

According to one embodiment of the present disclosure, there is provided a substrate inspection method including: capturing, while transporting a substrate with a fork, an image of a rear surface of the substrate using a line camera in which light receiving elements are arranged in a width direction orthogonal to a transport direction of the substrate; generating a corrected image by correcting the image captured in the capturing the image based on locus information of the fork when the substrate is being transported; and specifying feature information including a position of an abnormal portion existing on the rear surface of the substrate based on the corrected image.

BRIEF DESCRIPTION OF DRAWINGS

The accompanying drawings, which are incorporated in and constitute a part of the specification, illustrate embodiments of the present disclosure, and together with the general description given above and the detailed description of the embodiments given below, serve to explain the principles of the present disclosure.

FIG. 5 is a view for explaining an imaging process.

DETAILED DESCRIPTION

Figure 1:
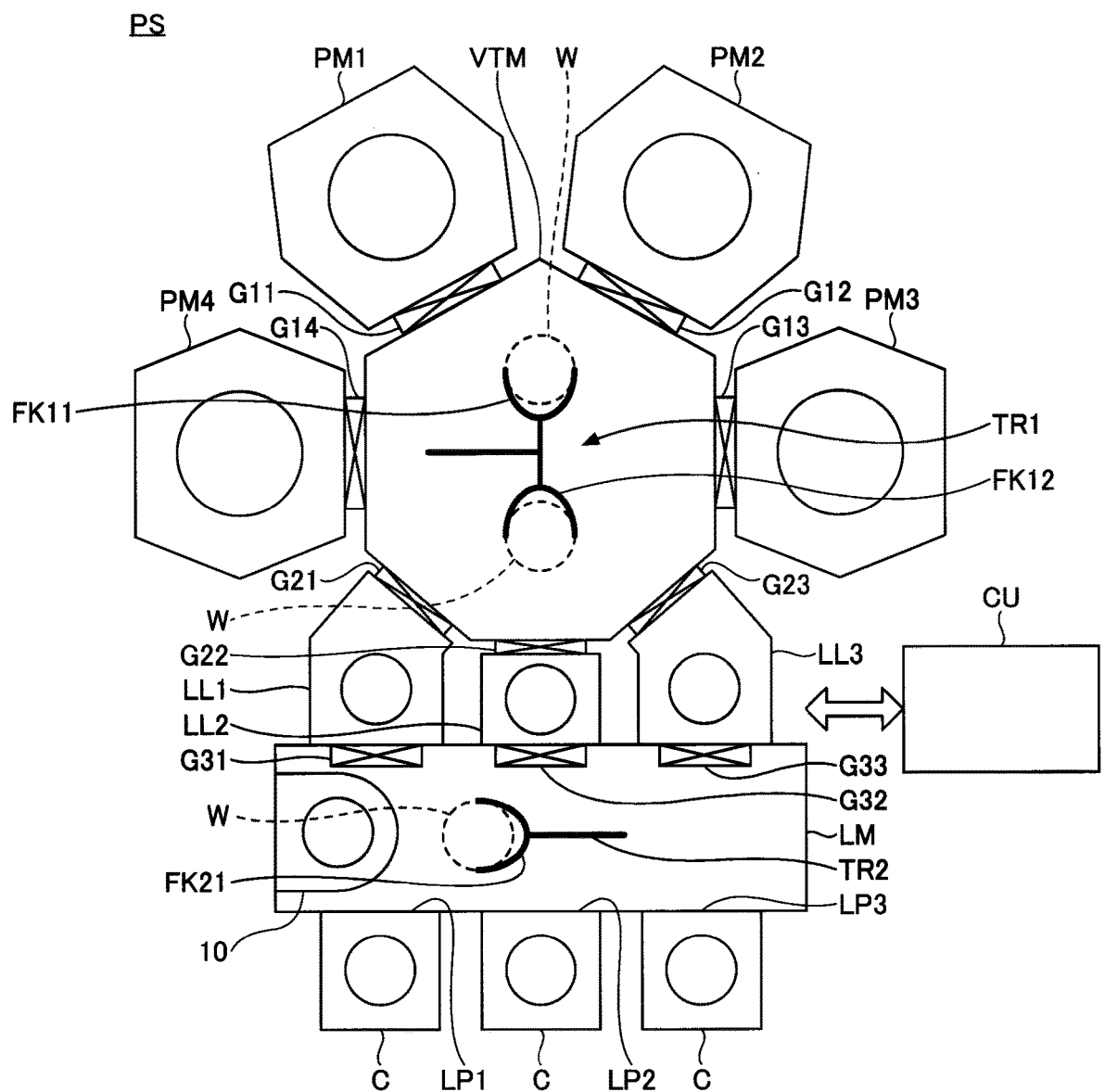
FIG. 1 is a view illustrating an example of a processing system according to an embodiment.

Reference will now be made in detail to various embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components have not been described in detail so as not to unnecessarily obscure aspects of the various embodiments.

Hereinafter, non-limiting exemplary embodiments of the present disclosure will be described with reference to the accompanying drawings. In all of the accompanying drawings, the same or corresponding members or components will be denoted by the same or corresponding reference numerals, and redundant descriptions will be omitted.

[Processing System]

An example of a processing system of an embodiment will be described with reference to FIG. 1.

The processing system PS includes processing apparatuses PM1 to PM4, a vacuum transport chamber VTM, load-lock chambers LL1 to LL3, an atmospheric transport chamber LM, load ports LP1 to LP3, an overall controller CU, and the like.

The processing apparatuses PM1 to PM4 are connected to the vacuum transport chamber VTM via gate valves G11 to G14, respectively. The interiors of the processing apparatuses PM1 to PM4 are depressurized to a vacuum atmosphere and each accommodate a substrate W to perform various processes on the same. The substrate W includes, for example, a semiconductor wafer. The various processes include, for example, a plasma process. In addition, the number of processing apparatuses PM1 to PM4 is not limited to four, and may be three or less, or five or more.

The interior of the vacuum transport chamber VTM is depressurized to a vacuum atmosphere. A transport mechanism TR1 is provided in the vacuum transport chamber VTM. The transport mechanism TR1 holds substrates W by forks FK11 and FK12, and transports the substrates W to the processing apparatuses PM1 to PM4 and the load-lock chambers LL1 to LL3.

The load-lock chambers LL1 to LL3 are connected to the vacuum transport chamber VTM via the gate valves G21 to G23, respectively, and are connected to the atmospheric transport chamber LM via the gate valves G31 to G33, respectively. The interiors of the load lock chambers LL1 to LL3 are switchable between an atmospheric atmosphere and a vacuum atmosphere. The number of load-lock chambers LL1 to LL3 is not limited to three, and may be two or less, or four or more.

The interior of the atmospheric transport chamber LM has an air atmosphere, for example, a downflow of clean air is formed. A substrate inspection device 10 and a transport mechanism TR2 are provided in the atmospheric transport chamber LM. The transport mechanism TR2 holds a substrate W by a fork FK21 and transports the substrate W to the load-lock chambers LL1 to LL3, the carriers C of the load ports LP1 to LP3, and the substrate inspection device 10. The substrate inspection device 10 may be provided outside the atmospheric transport chamber LM, for example, on the wall surface on a short side of the atmospheric transport chamber LM. The substrate inspection device 10 will be described later.

The load ports LP1 to LP3 are provided on the wall surface of a long side of the atmospheric transport chamber LM. The carriers C are installed in the load ports LP1 to LP3, respectively. The carrier C includes, for example, front opening unified pods (FOUP).

The overall controller CU may be, for example, a computer. The overall controller CU includes a central processing unit (CPU), a random access memory (RAM), a read only memory (ROM), an auxiliary storage device, and the like. The CPU operates based on a program stored in the ROM or the auxiliary storage device that are computer readable storage devices, and controls each part of the processing system PS. For example, the overall controller CU controls the operation of the processing apparatuses PM1 to PM4, the operation of the transport mechanisms TR1 and TR2, the opening/closing of the gate valves G11 to G14, G21 to G23, and G31 to G33, and the switching of the atmospheres inside the load-lock chambers LL1 to LL3, and the like.

[Substrate Inspection Device]

Figure 2:
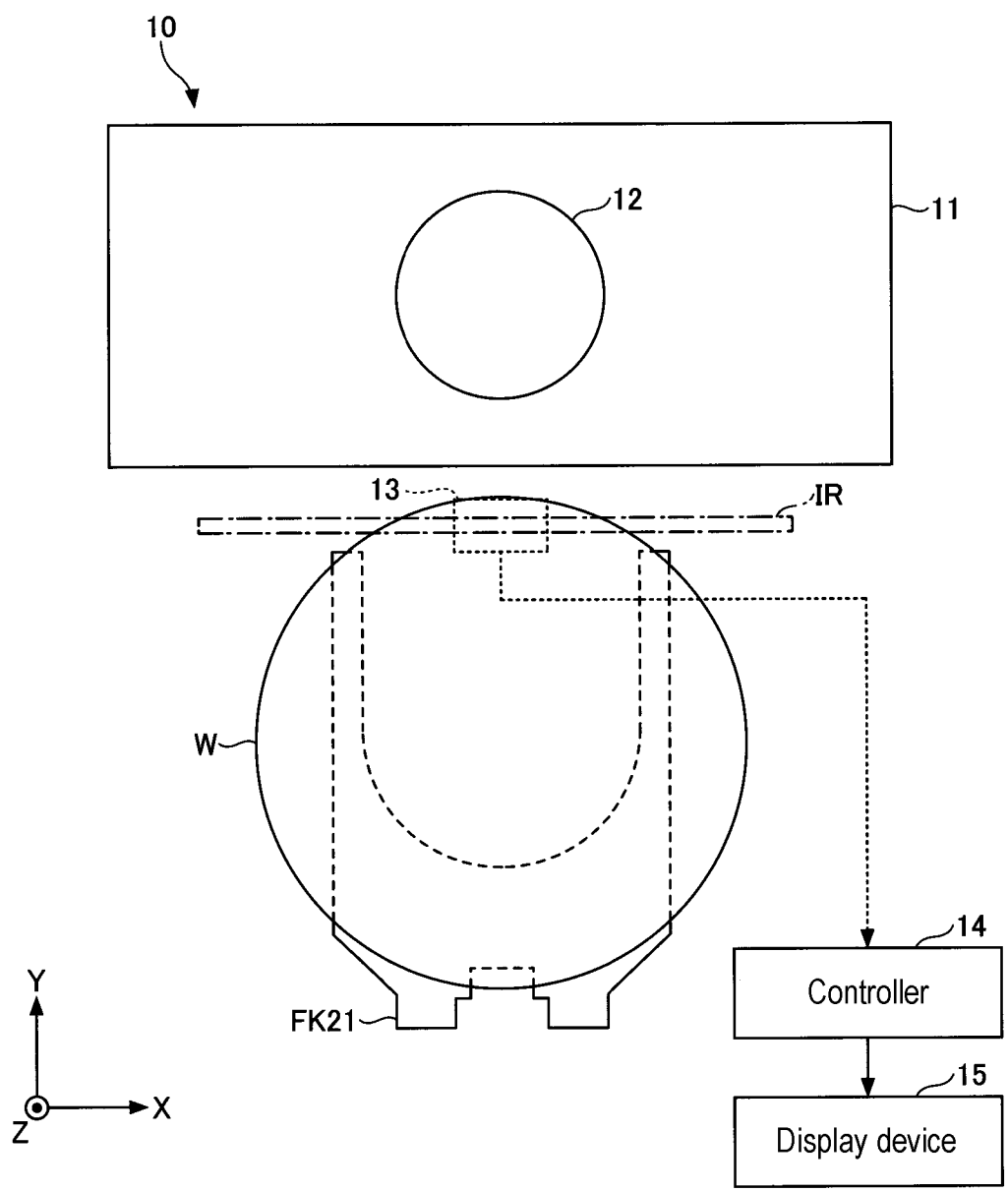
FIG. 2 is a plan view of an example of a substrate inspection device of an embodiment.
Figure 3:
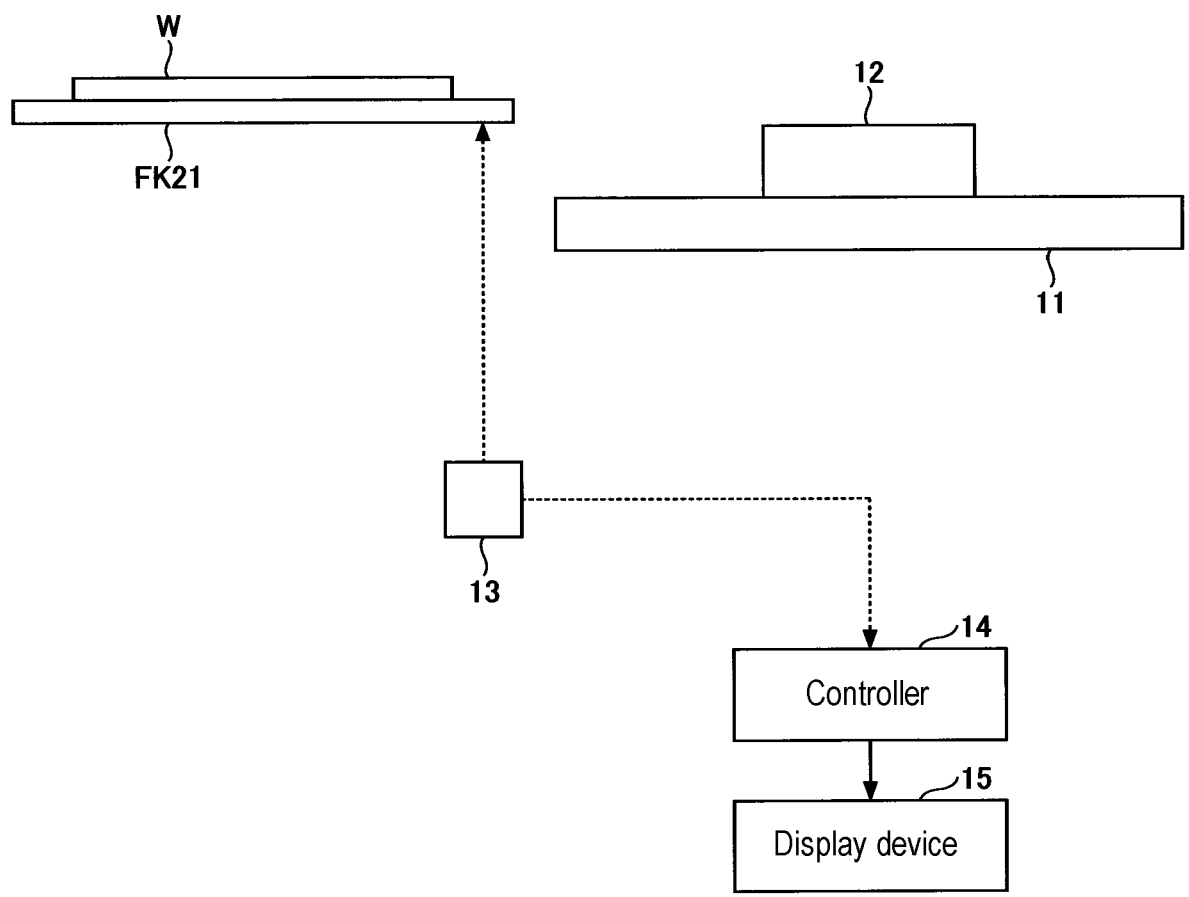
FIG. 3 is a side view of an example of a substrate inspection device of an embodiment.
Figure 4:
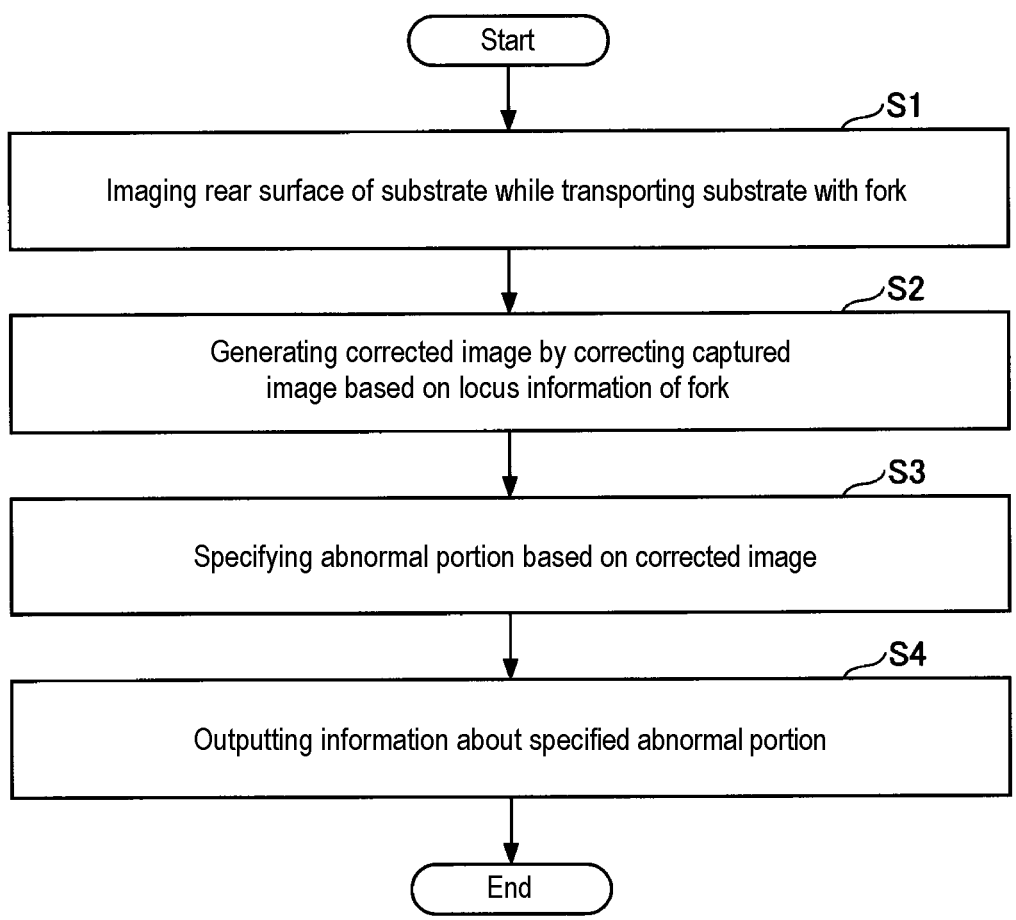
FIG. 4 is a flow chart illustrating an example of the substrate inspection method of an embodiment.

An example of the substrate inspection device 10 included in the processing system PS of the embodiment will be described with reference to FIGS. 2 and 3.

The substrate inspection device 10 is configured to be able to detect an abnormality on the rear surface of a substrate W by imaging the rear surface of the substrate W. In addition, the substrate inspection device 10 may be configured to function as an aligner capable of aligning a substrate W by detecting a notch position of the substrate W with an optical sensor.

The substrate inspection device 10 includes a base plate 11, a pedestal 12, a line camera 13, a controller 14, a display device 15, and the like.

The base plate 11 has a rectangular plate shape and supports the pedestal 12. The base plate 11 is made of, for example, aluminum nitride (AlN).

The pedestal 12 is provided on the base plate 11. The pedestal 12 is configured to be rotatable in the state of supporting a substrate W. However, the pedestal 12 does not have to have the function of rotating a substrate W. The pedestal 12 is formed of, for example, AlN.

The line camera 13 is provided at a position at which the line camera 13 is capable of capturing an image of the rear surface of a substrate W in the process of being transported by the fork FK21 when the fork FK21 carries the substrate W into the substrate inspection device 10 and/or when the fork FK 21 carries out the substrate W from the substrate inspection device 10. The line camera 13 images of the rear surface of the substrate W in the process of being transported by the fork FK21 line by line, and transmits a captured image to the controller 14 for each line. As illustrated in FIG. 2, for example, the line camera 13 is preferably configured to have an imaging region IR of 300 to 350 mm in a width direction orthogonal to a direction of transporting a substrate W by the fork FK21 (hereinafter, also simply referred to as a "width direction") so as to image the entire region of the substrate W. This makes it possible to specify the center position of the substrate W and the position of a notch (or an orientation flat), so that the substrate W can be aligned without using an aligner. Thus, a throughput and space efficiency are improved. However, the line camera 13 may be configured to have an imaging region of, for example, 150 to 250 mm in the width direction so as to be able to image a portion of a region including the center of the rear surface of a substrate W. The line camera 13 includes a light receiving element, a lens, and the like. Plural light receiving elements are arranged along the width direction. However, the lens may be provided separately from the line camera 13. The line camera 13 is a camera capable of high-speed imaging corresponding to the moving speed of the fork FK21, and has, for example, a frame rate of 26000 fps.

In addition, plural line cameras 13 may be provided in the width direction. This makes it possible to set the imaging region in the width direction per one line camera 13 to be small so that the line cameras 13 can be installed at a position close to the substrate W. Therefore, the space efficiency in the vertical direction is improved.

The controller 14 corrects a captured image received from the line camera 13 and generates a corrected image based on the locus information of the fork FK 21 received from the overall controller CU. In addition, the controller 14 specifies an abnormal portion existing on the rear surface of the substrate W based on the generated corrected image. Furthermore, the controller 14 outputs information about the specified abnormal portion to the display device 15.

The display device 15 is connected to the controller 14 and displays various information, for example, information related to an abnormal portion specified by the controller 14, based on a command of the controller 14. However, the display device 15 may be included in the controller 14, the overall control unit CU, or the like. In addition, the display device 15 may be included in a host computer, a client terminal, or the like that is capable of communicating with the controller 14, the overall controller CU, or the like.

[Substrate Inspection Method]

An example of a substrate inspection method of an embodiment will be described with reference to FIGS. 4 to 8. The substrate inspection method of the embodiment is performed on, for example, at least one of a substrate W before being transported to the processing apparatuses PM1 to PM4 and a substrate W on which various processes have been performed by the processing apparatuses PM1 to PM4. By performing the substrate inspection method of the embodiment on the substrate W before being transported to the processing apparatuses PM1 to PM4, it is possible to detect an abnormality on the rear surface of the substrate W before the various processes are performed. In addition, by performing the substrate inspection method of the embodiment on the substrate W on which the various processes have been performed by the processing apparatuses PM1 to PM4, it is possible to detect an abnormality on the rear surface of the substrate W on which the various processes have been performed. Furthermore, by performing the substrate inspection method of the embodiment at both of the above-described timings, it is possible to detect an abnormality on the rear surface of the substrate W caused by the various processes performed by the processing apparatuses PM1 to PM4.

Figure 6:
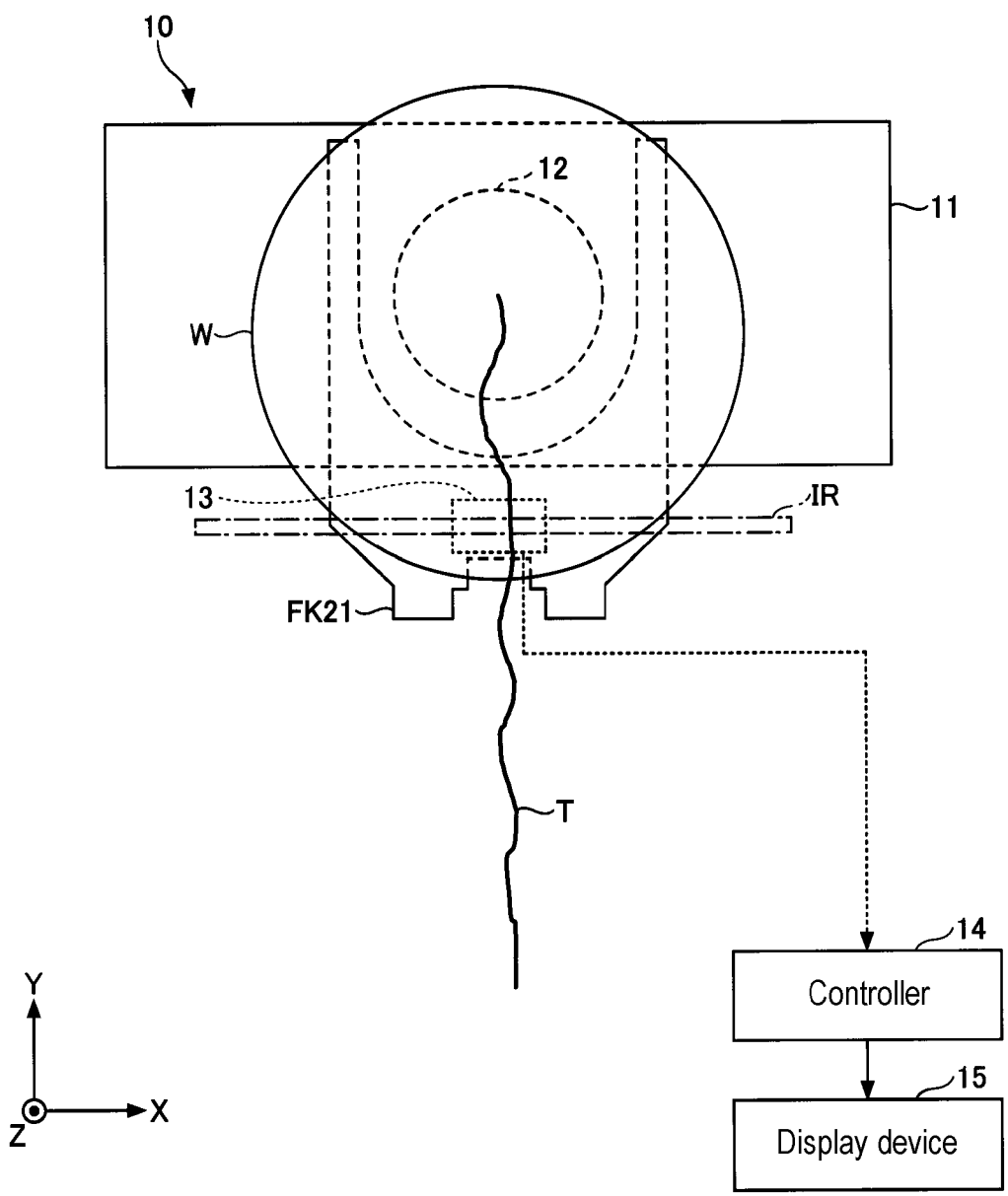
FIG. 6 is a view illustrating an example of a captured image.

First, in step S1, the overall controller CU controls the transport mechanism TR2 to transport the fork FK 21 holding a substrate W to an upper side of the pedestal 12 in the substrate inspection device 10. The line camera 13 images the rear surface of the substrate W in the process of being transported by the fork FK 21, and transmits a captured image to the controller 14. The captured image includes, for example, as illustrated in FIG. 5, an image A20 obtained by synthesizing images A11 to A19 captured for each line. Each of the images A11 to A19 has a length of, for example, 300 mm to 350 mm in the X direction and a length of, for example, 50 to 100 μm in the Y direction. In addition, the overall controller CU transmits, to the controller 14, the locus information of the fork FK 21 when the substrate W is being transported to the upper side of the pedestal 12 in the substrate inspection device 10. The locus information of the fork FK21 includes time-series position information in which times are associated respectively with horizontal positions (X positions and Y positions) and vertical positions (Z positions) of the fork FK21. In step S1, the fork FK21 may operate at a high speed (e.g., 2 m/sec) and may draw a moving locus T while finely meandering in the horizontal direction (the X direction and the Y direction) and the vertical direction (Z direction), for example, as illustrated in FIG. 6.

Figure 7:
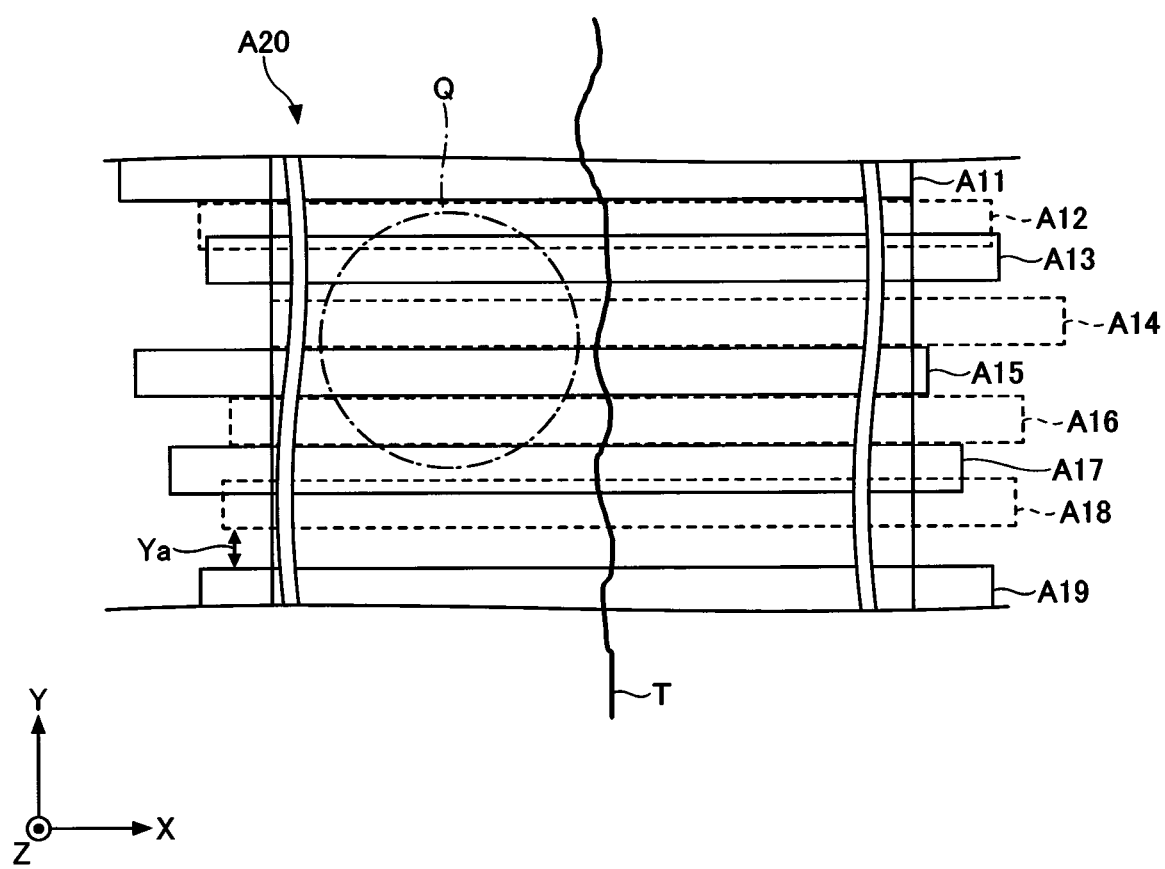
FIG. 7 is a view illustrating an example of a corrected image.

Next, in step S2, the controller 14 corrects a captured image received from the line camera 13 and generates a corrected image based on the locus information of the fork FK 21 received from the overall controller CU. For example, as illustrated in FIG. 7, the controller 14 aligns the center position of each of the images A11 to A19 in the X direction based on the X position of the fork FK21 at the time at which each of the images A11 to A19 is captured. In addition, as illustrates in FIG. 7, the controller 14 adjusts the position of each of the images A11 to A19 in the Y direction based on the Y position of the fork FK21 at the time at which each of the images A11 to A19 is captured. Furthermore, the controller 14 adjusts the size of each of the images A11 to A19 based on the Z position of the fork FK21 at the time at which each of the images A11 to A19 is captured. In the corrected image, as illustrated in FIG. 7, a gap Ya may occur between adjacent images in the images A11 to A19, but the size of the gap Ya is smaller than the size of an abnormal portion Q. Therefore, even if the gap Ya is generated, it is possible to specify the abnormal portion Q in step S3 described later.

Next, in step S3, the controller 14 specifies an abnormal portion existing on the rear surface of the substrate W based on the corrected image generated in step S2. For example, the controller 14 specifies an abnormal portion existing on the rear surface of the substrate W based on the corrected image generated in step S2 by using a trained model in which machine learning has been performed. In addition, for example, the controller 14 may perform an image process such as a binarization process on the corrected image generated in step S2 to specify an abnormal portion existing on the rear surface of the substrate W. The abnormal portion includes, for example, a discharge mark, a particle, and a scratch.

Figure 8:
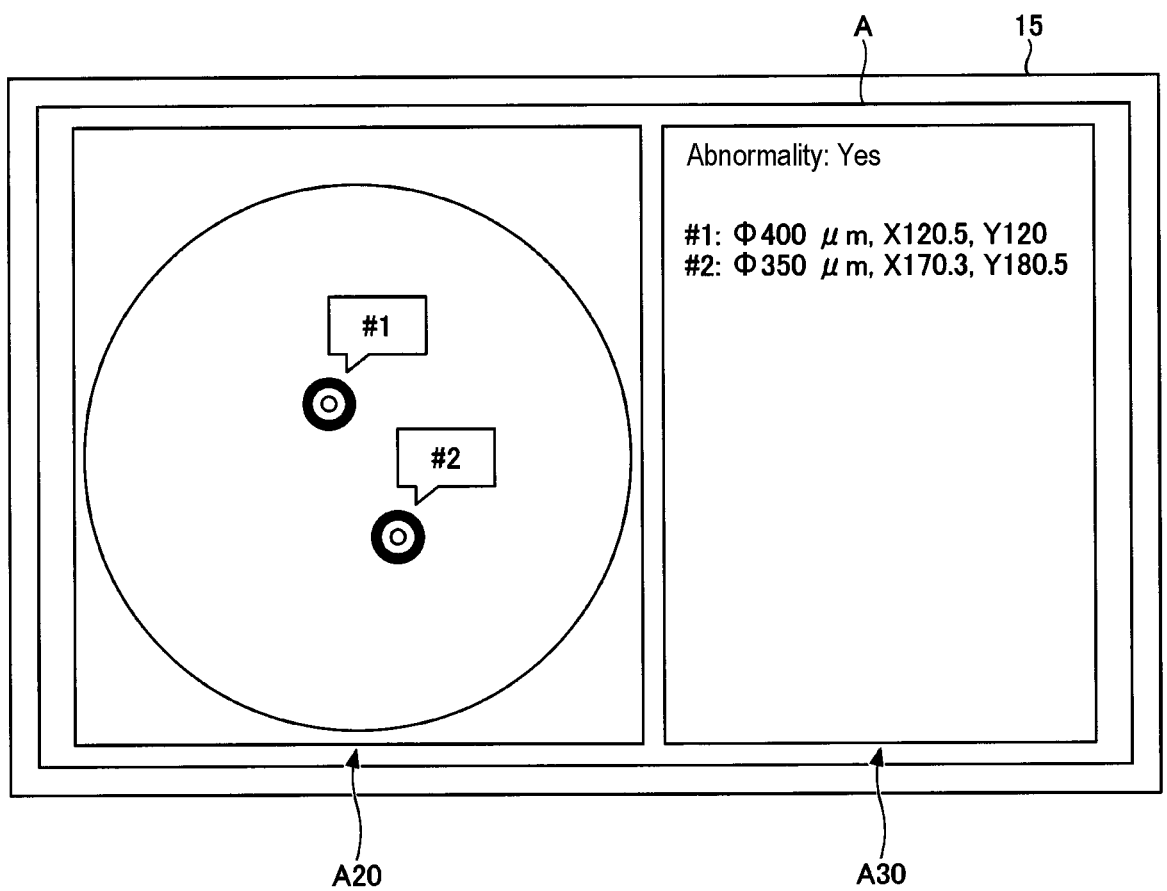
FIG. 8 is a view illustrating an example of an output image.

Next, in step S4, the controller 14 outputs information about the abnormal portion specified in step S3 to the display device 15. The information about the abnormal portion includes the size, position, or the like of the abnormal portion. The display device 15 displays an image in response to a command from the controller 14. As illustrated in FIG. 8, an image display part A of the display device 15 includes a substrate image display part A20, an abnormality display part A30, and the like. However, the image display part A may be in a form including only one of the substrate image display part A20 and the abnormality display part A30.

The substrate image display part A20 displays the corrected image generated in step S2. In the example of FIG. 8, as a corrected image, a rear surface image of a circular substrate W including two abnormal portions #1 and #2, which are examples of the abnormal portion Q, is displayed, and the abnormal portions #1 and #2 are highlighted by being surrounded by markers, respectively. As a result, an administrator or the like is capable of confirming that the two abnormal portions #1 and #2 are present on the rear surface of the substrate W by confirming the image displayed on the substrate image display part A20.

The abnormality display part A30 displays information about the abnormal portions specified in step S3. In the example of FIG. 8, as the information about the abnormal portions, "Abnormality: Yes" indicating that there are abnormalities is illustrated. In addition, in the example of FIG. 8, as information about the abnormal portions, "#1: Φ400 μm, X120.5, Y120" indicating the size and position of the abnormal portion #1, and "Φ350 μm, X170.3, Y180.5" indicating the size and position of the abnormal portion #2 are illustrated. As a result, by checking the image displayed on the abnormality display part A30, an administrator or the like is capable of determining that there is an abnormality, and the sizes and positions of the two abnormal portions #1 and #2, and the like. In addition, it is preferable for the information about the abnormal portions to include the cause of the abnormal portions and a measure for removing the abnormal portions. As a result, an administrator or the like is capable of easily determining a measure for removing the abnormal portions by checking the image displayed on the abnormality display part A30. The measure for removing the abnormal portions include, for example, parameters (e.g., plasma parameters) for performing various processes by the processing apparatuses PM1 to PM4.

In step S4, it is preferable for the controller 14 to issue an alarm according to the abnormal portions specified in step S3. This makes it possible for an administrator or the like to quickly determine that there is an abnormality in the substrate W.

In addition, in step S4, the controller 14 preferably transmits a command to the overall controller CU such that the substrate W is transported to a dummy storage (not illustrated) by the fork FK21 according to the abnormal portions specified in step S3. This makes it possible to prevent an abnormal substrate W from being sent to the next process.

As described above, in the substrate inspection method of the embodiment, a corrected image is generated by correcting the image of the rear surface of the substrate W captured by the line camera 13 based on the locus information of the fork FK21 when the substrate W is being transported, and then abnormal portions are specified based on the generated corrected image. This makes it possible to accurately specify the sizes, positions, and the like of the abnormal portions existing on the rear surface of the substrate W.

In particular, when a substrate W is held and transported at a high speed (e.g., 2 m/sec) by the fork FK21, the fork FK 21 may draw a moving locus T while finely meandering in the horizontal direction (the X direction and the Y direction) and the vertical direction (the Z direction). When the fork FK21 meanders in the XYZ directions, and an entire image is generated based on the image for each line captured by the line camera 13, a blur is generated in the entire image. Therefore, it is difficult to specify a correct size, position, or the like of an abnormal portion.

In contrast, in the substrate inspection method of the embodiment, a corrected image is generated by correcting the image of the rear surface of the substrate W captured by the line camera 13 based on the locus information of the fork FK21 when the substrate W is being transported, and then abnormal portions are specified based on the generated corrected image. As a result, even when the substrate W is held by the fork FK21 and transported at a high speed, the size, position, and the like of the abnormal portion existing on the rear surface of the substrate W can be accurately specified.

In the substrate inspection method of the embodiment, the case in which the controller 14 generates a corrected image by correcting the image of the rear surface of a substrate W captured by the line camera 13 based on the locus information of the fork FK 21 when the substrate W is being transported has been described, but the present disclosure is not limited thereto. For example, instead of the controller 14, the overall controller CU may generate a corrected image. In addition, in the substrate inspection method of the embodiment, the case in which the controller 14 specifies an abnormal portion based on the generated corrected image has been described, but the present disclosure is not limited thereto. For example, instead of the controller 14, the overall controller CU may specify an abnormal portion.

The embodiments disclosed herein should be considered to be exemplary in all respects and not restrictive. The above-described embodiments may be omitted, replaced, or modified in various forms without departing from the scope and spirit of the appended claims.

In the above-described embodiments, the case of specifying an abnormal portion existing on the rear surface of a substrate W has been described, but the present disclosure is not limited thereto. For example, instead of or in addition to an abnormal portion, separate feature information of the center position of a substrate W, a notch (or an orientation flat) position formed in the substrate W, or the like may be specified. For example, the controller 14 detects an outer peripheral position of a substrate W by performing an image process on a corrected image, and specifies the center position of the substrate W based on the detected outer peripheral position. For example, the controller 14 specifies the notch position of the substrate W by performing the image process on the corrected image. By specifying the center position and the notch position of the substrate W in this way, the alignment of the substrate W in the horizontal direction and the rotation direction can be performed so that the substrate inspection device 10 can be made to function as an aligner. More specifically, first, a substrate W is placed on the pedestal 12, and the pedestal 12 is rotated such that the notch position of the substrate W faces a predetermined direction. Subsequently, the fork FK21 is inserted into a position at which the center of the fork FK21 coincides with the center position of the substrate W, and the substrate W placed on the pedestal 12 is received by the fork FK21. This makes it possible to perform alignment of the substrate W in the horizontal direction and the rotation direction so that the substrate inspection device 10 can be made to function as an aligner.

According to the present disclosure, it is possible to detect an abnormality of the rear surface of a substrate.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A substrate inspection method comprising:
   capturing, while transporting a substrate with a fork, an image of a rear surface of the substrate;
   generating a corrected image by correcting the image captured in the capturing the image based on time-series position information of the fork while transporting the substrate; and
   specifying feature information including a position of an abnormal portion existing on the rear surface of the substrate based on the corrected image,
   wherein, in the capturing the image, the image of the rear surface of the substrate is obtained by capturing the rear surface of the substrate line by line using a line camera in which light receiving elements are arranged in a width direction orthogonal to a transport direction of the substrate so as to obtain plural line images and synthesizing the plural line images; and
   wherein the time-series position information of the fork includes time-series horizontal positions and time-series vertical positions of the fork.

2. The substrate inspection method of claim 1, wherein, in the generating the corrected image, the image captured in the capturing the image is corrected for each line.

3. The substrate inspection method of claim 2, wherein the feature information includes a size of the abnormal portion.

4. The substrate inspection method of claim 3, wherein the feature information includes a position of a notch or an orientation flat formed on the substrate.

5. The substrate inspection method of claim 4, wherein, in the capturing the image, an entire region of the substrate is imaged by the line camera.

6. The substrate inspection method of claim 5, wherein plural line cameras are provided in the width direction, and
   wherein in the capturing the image, the rear surface of the substrate is captured with the plural line cameras.

7. The substrate inspection method of claim 6, wherein the substrate is a plasma-processed substrate, and
   wherein the feature information includes a position and a size of a discharge mark.

8. The substrate inspection method of claim 1, wherein the feature information includes a size of the abnormal portion.

9. The substrate inspection method of claim 1, wherein the feature information includes a position of a notch or an orientation flat formed on the substrate.

10. The substrate inspection method of claim 1, wherein, in the capturing the image, an entire region of the substrate is imaged by the line camera.

11. The substrate inspection method of claim 1, wherein, in the capturing the image, a partial region of the substrate is imaged by the line camera.

12. The substrate inspection method of claim 1, wherein plural line cameras are provided in the width direction, and
    wherein in the capturing the image, the rear surface of the substrate is captured with the plural line cameras.

13. The substrate inspection method of claim 1, wherein the substrate is a plasma-processed substrate, and
    wherein the feature information includes a position and a size of a discharge mark.

14. A substrate inspection device comprising:
    a fork configured to transport a substrate;
    a line camera in which light receiving elements are arranged in a width direction orthogonal to a transport direction of the substrate; and
    a controller,
    wherein the controller is configured to control the fork and the line camera to perform:
    capturing, while transporting the substrate with the fork, an image of a rear surface of the substrate with the line camera;

generating a corrected image by correcting the image captured in the capturing the image based on time-series position information of the fork while transporting the substrate; and specifying feature information including a position of an abnormal portion existing on the rear surface of the substrate based on the corrected image wherein, in the capturing the image, the image of the rear surface of the substrate is obtained by capturing the rear surface of the substrate line by line using the line camera so as to obtain plural line images and synthesizing the plural line images, and wherein the time-series position information of the fork includes time-series horizontal positions and time-series vertical positions of the fork.

* * * * *